United States Patent [19]

Ionov et al.

[11] Patent Number: 5,991,314
[45] Date of Patent: Nov. 23, 1999

[54] DESIGN FOR A YB-DOPED CP FIBER LASER FOR OPERATING NEAR EDFA ABSORPTION BAND

[75] Inventors: Stanislav I. Ionov, Calabasas; Dennis C. Jones, Malibu; Metin S. Mangir, Santa Monica, all of Calif.

[73] Assignee: Hughes Electronics Corporation, El Segundo, Calif.

[21] Appl. No.: 09/058,539

[22] Filed: Apr. 10, 1998

[51] Int. Cl.[6] ........................................... H01S 3/30
[52] U.S. Cl. .................... 372/6; 372/19; 372/32; 372/102
[58] Field of Search ................. 372/6, 102, 19, 372/32

[56] References Cited

U.S. PATENT DOCUMENTS 5,260,823  11/1993  Payne et al. ................................ 372/6
5,778,014   7/1998  Islam .......................................... 372/6

OTHER PUBLICATIONS

Pask, H.M., et al, "Ytterbieum–Doped silica Fiber Lasers" Versatile Sources for the 1–12 μm Region 1 IEEE Journal of Selected Topics in Quantum Electronics, vol. 1, (Apr., 1995), pp. 1–13.

Vengsarkar, A.M., et al. "Long–Period Fiber Gratings as Band–Rejection Filters" IEEE, Journal of Lightwave Technology, vol. 14, No. 1, (Jan. 1996) pp. 58–65.

Hanna, D.C., et al. "An ytterbium–doped monomode fibre laser; broadly tunable operation from 1.010μm to 1.162μm and three–level operation at 974 nm" Journal of Modern Optics, (1990) vol. 37, No. 4, pp. 517–525.

Armitage, J.R., et al. "An Yb$^{3-}$ Doped Silica Fibre Laser" Electronics Letters, vol. 25, No. 5 (Mar. 1989) pp. 298–299.

*Primary Examiner*—Leon Scott, Jr.
*Attorney, Agent, or Firm*—V. D. Duraiswamy; M. W. Sales

[57] ABSTRACT

A Yb-doped cladding pumped fiber laser includes a reflective grating located at each distal end of the laser cavity. Each reflective grating can reflect light propagating inside a fiber core and at a desired wavelength range. A plurality of band-rejecting gratings are disposed between the reflective gratings, whereby the band-rejecting gratings can couple light at an undesired wavelength range and out of the fiber core. When the band-rejecting gratings are in an end-to-end relationship, they are separated by a distance of approximately L whereby $L=[(\sigma_e^d+\sigma_a^d)\ln 1/T]/[n(\sigma_a^d\sigma_e^u-\sigma_e^d\sigma_a^u)]$, n is a concentration of ions subject to excitation, $\sigma_a^d$ is an absorption cross section at said desired wavelength range, $\sigma_e^u$ is an emission cross section at said undesired wavelength range, $\sigma_e^d$ is an emission cross section at said desired wavelength range, $\sigma_a^u$ is an absorption cross section at said undesired wavelngth range, and T is a band-rejecting grating transmission factor. The number of band-rejecting gratings is given by N whereby $N=d/L \geq dn\ (\sigma_a^d\sigma_e^u-\sigma_e^d\sigma_a^u)/[\sigma_e^d+\sigma_a^d)\ln 1/T]$ and d is the length of the laser.

31 Claims, 1 Drawing Sheet

DESIGN FOR A YB-DOPED CP FIBER LASER FOR OPERATING NEAR EDFA ABSORPTION BAND

BACKGROUND OF THE INVENTION

1. Field of the Invention

The present invention generally relates to cladding pumped fiber lasers and, more particularly, to an improved ytterbium (Yb)-doped cladding pumped fiber laser that operates at around 970 to 980 nm which is the absorption band of erbium doped fiber amplifiers. It also relates particularly to an improved method of wavelength discrimination to remove parasitic lasing that occurs at wavelengths longer than the desired wavelength in a cladding pumped fiber laser.

2. Description of Related Art

The continuing interest in fiber lasers over bulk lasers stems from the ability to achieve very long gain media that have negligible losses and a good overlap with pump beams. Fiber lasers also have lower pump thresholds. Another advantage of a fiber laser is that they operate at the lowest transverse mode that can be easily and efficiently injected into other fibers.

In fiber lasers, one goal has been to provide flexibility in operating wavelength, cavity length, and application. With more flexibility, there can be more useful applications of the laser. But in seeking maximum flexibility in those areas, a need to achieve wavelength discrimination arises. In the past, bulk elements such as prisms, gratings, and lenses inside the laser cavity have been used for wavelength discrimination. However, those elements not only use valuable space due to their bulk, they also create energy losses. To minimize losses, fiber gratings have been used as fiber mirrors to provide narrow linewidth operation at a given wavelength. Conventionally, reflective Bragg gratings have been photolithographically written into the fiber core to achieve lasing at a specific wavelength while suppressing another wavelength. But that technique provides less than adequate discrimination as the gain at unwanted wavelengths increases.

As a further example of an attempt to achieve wavelength discrimination, Vengsarkar et al., "Long-Period Fiber Gratings as Band-Rejection Filters, Journal of Lightwave Technology, Vol. 14, No. 1, pg 58 (1996) describe in-fiber, long-period fiber gratings that act as low-loss, band-rejection filters. However, Vengsarkar et al. teach that a single fiber grating be placed outside of a laser cavity after the light has been launched into a fiber. But doing so does not adequately address the problem of recurring, unwanted wavelength inside a laser cavity, which thereby results in lowering system efficiency at the desired wavelength or, ultimately, suppressing it completely.

Another desirable goal of fiber laser technology has been to achieve high power, multi-Watt output from the laser. Of course, with a greater range of laser output, there is a greater range of applications. But, in the past, it has been found that a cladding-pumped fiber laser geometry with multi-mode laser diodes as a pump source is the only practical means of achieving multi-Watt output. On the other hand, it is known that, in comparison to a non-cladding pumped geometry, a cladding pumped geometry increases the absorption length and so must the cavity length increase. Thus, if a cladding pumped geometry must be used, additional constraints are imposed in the construction of the laser.

Whether for cladding pumped or otherwise, it has been common practice in fiber laser construction to use rare earth elements as dopants. Any particular dopant will have a particular energy level transition scheme. When subjected to excitation, the dopant provides the lasing action which derives from its particular energy level transition scheme. Some of the common dopants are ytterbium (Yb), erbium (Er), praseodymium (Pr), and neodymium (Nd). The fiber materials have often been silica glass, germanosilicate or zirconium fluoride glass (ZBLAN).

The use of Yb for doping continues to gain interest over other dopants due to its high efficiency based on its simple energy structure. It has a ground manifold with four Stark levels and an excited manifold with three Stark levels, with the two manifolds being separated by about 10,000 cm$^{-1}$. The relatively large separation of other energy levels from the two lowest manifolds eliminates excited state absorption (ESA) at either pump or laser wavelengths. The 10,000 cm$^{-1}$ energy gap between the ground and excited manifolds also precludes nonradiative decay via multiphonon emission from the excited manifold, as well as precluding concentration quenching.

Yb-doped fibers exhibit broad absorption and emission bands—about 800 nm to 1064 nm for absorption and about 970 nm to 1200 nm for emission. There is a spectral range from about 970 to 1064 nm which comprises an overlapping area of absorption and emission. With a broad absorption band for Yb-doped fiber lasers, there can be a broad choice of pump wavelengths. Accordingly, Yb-doped fiber lasers provide an efficient and convenient means of wavelength conversion from different pump lasers, such as AlGaAs and InGaAs diodes, Ti:sapphire lasers, Nd:YAG lasers and Nd:YLF lasers.

Operation of Yb-doped fiber lasers has been achieved on a three-level scheme at around 970–980 nm and on a four-level scheme at around 1030–1200 nm. However, operation on a three-level scheme is considerably more challenging, since high pump intensities are required to bleach initial absorption. Also, ytterbium has often been used as a sensitizer ion to absorb pump power over a wide range and then transfer the excitation to an acceptor ion, such as erbium (Er), which acts as the laser-active ion.

The interest in Er-doped fiber amplifiers (EDFAs) has been due to their operating wavelength of 1.55 $\mu$m that falls within the low absorption window of telecommunications fibers. They are efficient, i.e., a moderate amount of pump is wasted. EDFAs have gain over a wide spectral range that supports many high-speed telecommunications channels and can achieve gain of up to about 35 to 40 dB. The noise output from EDFAs is relatively low. They have long upper carrier lifetimes that minimize cross-talk between different communication channels. They are also small and compact.

Because of the advantages presented by EDFAs, interest in them has been particularly high in the area of telecommunications and, more lately, in laser satellite communications. But EDFAs have the disadvantage of a low pump absorption cross-section which requires very intense single transverse mode pump sources operating at 980 or 1450 nm.

Given the fact that a Yb-doped laser can operate at 980 nm, it would be advantageous to pump EDFAs with Yb-doped fiber lasers. And because of the closeness of pump and lasing wavelengths, relatively high slope efficiencies (output power vs. input power) can be achieved in Yb-doped fiber lasers.

Notwithstanding the desirability of Yb-doped fiber lasers operating at about 970 to 980 nm, the inherent three-level scheme makes such pumping problematic. At about 1030 nm and longer wavelengths, a Yb-doped fiber laser operates on the quasi four-level scheme. That energy level scheme requires only moderate inversion (less than 10%) to overcome the laser threshold and achieve gain. In contrast, the three-level scheme requires more than 50% of all Yb ions to be excited to the upper manifold to overcome the laser threshold. Thus, since the quasi four-level scheme requires less inversion than the three-level scheme, threshold conditions are often met first for the four-level scheme as power is pumped into the laser. And, there is a resulting tendency for the Yb ions to operate at 1030 nm or longer wavelengths.

Accordingly, unwanted or parasitic lasing at more than about 1020 nm may preclude achieving the desired lasing wavelength at about 980 nm. It can be appreciated that even small laser cavity reflections at parasitic wavelengths greater than about 1020 nm can result in a lower threshold for the parasitic wavelength than that for the desired one. As a result, lasing is first achieved at the longer wavelength, thereby clamping or holding the inversion at the threshold level for the parasitic wavelength. With the inversion clamped at a parasitic threshold, the desired inversion for 980 nm cannot be achieved. Further, even if the pump power is increased, the result is that inversion only occurs faster and more photons are omitted at longer wavelengths at the quasi four-level scheme and to the exclusion of the three-level scheme. Such competition of shorter vs. longer wavelengths occurs elsewhere over the Yb gain spectrum. For example, a desired Yb operation at 1064 nm may be hindered by parasitic lasing at 1090 nm, or 1030 nm lasing may be suppressed by 1060 nm lasing, etc. This is generally the case since higher inversions are required for a shorter vs. a longer wavelength.

As can be seen, there is a need for improved cladding pumped Yb-doped fiber lasers that can provide multi-Watt output. Additionally, there is a need for a Yb-doped fiber laser that operates at about 970–980 nm, which is the absorption bandwidth for EDFAs. Further, a fiber laser is needed to overcome parasitic lasing that occurs at wavelengths longer than the operating wavelength.

SUMMARY OF THE INVENTION

The present invention is directed to an improved Yb-doped, cladding pumped fiber laser that operates around the absorption band of erbium doped fiber amplifiers, namely, 970 to 980 nm. The invention is also directed to an improved method of removing parasitic lasing in a doped, cladding pumped fiber laser wherein the parasitic lasing occurs at a longer wavelength than the desired wavelength and also wherein a dopant population inversion requirement for the desired wavelength is higher than that of the parasitic or undesired wavelength.

Specifically, the improved cladding pumped fiber laser according to this invention includes a pair of reflective gratings which can reflect light at a desired wavelength range. A reflective grating is located at each distal end of the laser cavity. A plurality of band-rejecting gratings are disposed between the reflective gratings, whereby the band-rejecting gratings can couple out light at an undesired wavelength range. When the band-rejection gratings are in an end-to-end relationship, they are separated by a distance L, whereby $$L = [(\sigma_e^d + \sigma_a^d) \ln 1/T]/[n(\sigma_a^d \sigma_e^u - \sigma_e^d \sigma_a^u)]$$

and wherein $\sigma_a^d$ is an absorption cross section at the desired wavelength range, $\sigma_e^u$ is an emission cross section at the undesired wavelength range, $\sigma_e^d$ is an emission cross section at the desired wavelength range, $\sigma_a^u$ is an absorption cross section at the undesired wavelngth range, n is a dopant concentration, and T is a band-rejecting grating transmission factor.

In the improved method of the present invention, the steps include reflecting light at the desired wavelength range, with such step occurring substantially at the distal ends of the laser. Another step includes rejecting light at the undersired wavelength range at a rejection area within said laser, wherein the rejection area is intermediate the distal ends of the laser. Within the step of rejecting light, there is a step of minimizing a dopant population inversion effect associated with the undesired wavelength range and optimizing a dopant population inversion effect associated with the desired wavelength range. The desired and undesired wavelength ranges are each characterized by a respective population inversion requirement, with the desired wavelength range having a higher population inversion requirement in comparison to the undesired wavelength range. Put another way, the step of minimizing includes the step of suppressing laser operation and/or ASE at the undersired wavelength, thereby allowing the dopant population inversion to be increased from the threshold level required for the undesired wavelength to the threshold level required by the desired wavelength.

These and other features, aspects and advantages of the present invention will become better understood with reference to the following drawings, description, and claims.

DESCRIPTION OF THE PREFERRED EMBODIMENTS

Figure 1:
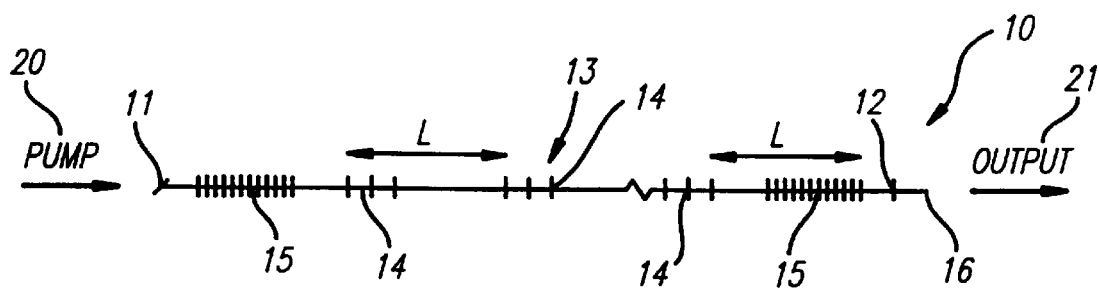
FIG. 1 is a diagram depicting an embodiment of the present invention.

FIG. 1 diagramatically shows a doped, cladding pumped fiber laser 10 according to a preferred embodiment of the present invention. Generally, the laser 10 includes a fiber core 16 which has a pair of reflective gratings 15 and a rejection area 13. The rejection area 13 includes a plurality of band-rejecting gratings 14. Thereby, a pump source 20 can pump light into an inner cladding 17 of the fiber laser 10. As the emitted light passes through the core 16 in the rejection area 13, the band-rejecting gratings 14 couple out wavelengths falling within an undesired wavelength range, while transmitting wavelengths in a desired wavelength range. The reflective gratings reflect wavelengths at the desired wavelength range. Consequently, lasing occurs at the desired wavelength range in the substantial absence of parasitic lasing and produces an output 21.

Figure 2:
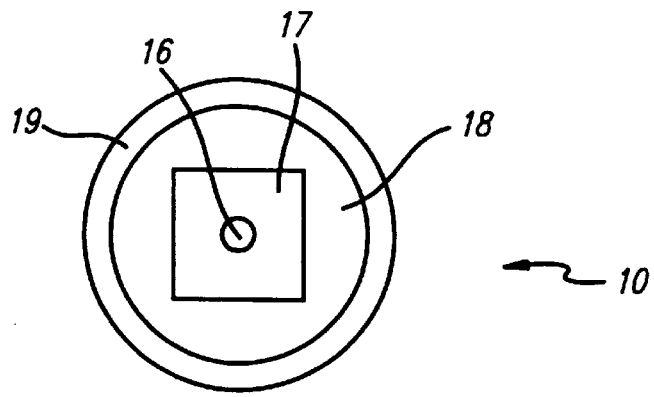
FIG. 2 is a cross-sectional view of an embodiment of the present invention.

In further describing the present invention, FIG. 2 shows a cross-sectional view of the laser 10 which has the fiber core 16 that contains Yb dopants. The fiber core 16 is encompassed by an inner cladding 17, an outer cladding 18 that surrounds the inner cladding 17, and a cover 19 that surrounds the outer cladding 18. That particular cladding geometry comes in the commercial product from NOI and Polaroid. Yet, it is contemplated that the fiber need not be commercially purchased. The purpose of the inner cladding 17 is to keep the single-mode laser radiation within the core 16 and to transport multi-mode pump radiation. The outer cladding 18 is to keep the transported pump light within the inner cladding 17, and the cover 19 is to protect the fiber core 16 from mechanical damage.

Although not depicted in FIG. 2, and as mentioned above, the fiber core 16 is constructed with a ytterbium dopant. As is known in the art, the dopant concentration selected is dependent upon the desired length of the fiber laser 10 and its cross-sectional geometry. If obtained from commercial sources, the fiber core 16 is already doped in an appropriate concentration.

In again referring to FIG. 1, the fiber laser 10 has a first distal end 11 and a second distal end 12. For this embodiment of the invention, the distal end 11 is angle cleaved at about 8 to 10 degrees in order to minimize reflection from the first distal end 11 back into the fiber core 16, as is known in the art. However, the angle of cleaving can be changed from 8 to 10 degrees to about 12 degrees, for example, in order to further minimize reflection. The distal end 12, as shown in FIG. 1, is straight cleaved in order for the fiber to be spliced to another fiber if one wanted to keep the laser output 21 confined in a fiber medium. If the fiber laser 10 is not intended to be spliced to another fiber, then the second distal end 12 can be angle cleaved at about 8 to 10 degrees to minimize back reflection from the distal end 12 and into the fiber core 16.

Intermediate the distal ends 11,12 is the rejection area 13 which comprises the plurality of band-rejecting gratings 14 which are long-period gratings well known in the art. Although this embodiment of the invention uses a plurality of gratings 14 in the rejection area 13, it is contemplated that only a single band-rejecting grating 14 can be used for specific laser designs. However, it is preferred to use more than a single band-rejecting grating 14 because multiple gratings 14 can spread the rejection area 13 over the entire fiber core 16 length. Spreading the rejection area is not essential for suppressing parasitic lasing at the unwanted wavelength. However, it is important for suppressing amplified spontaneous emission (ASE). For ASE to occur, there needs to be a sufficient length of the gain medium without loss to amplify the unwanted wavelength from the spontaneous emission level to the saturation level. Spreading shortens the length of the gain medium at the unwanted wavelength to that of a distance between the rejection gratings 14, thereby suppressing ASE at the unwanted wavelength. Although a single long grating 14 that is as long as the fiber laser 10 may achieve the same purpose, writing a single long grating may also not be practical. The band-rejecting gratings 14 are incorporated into the commercially provided fiber core 16 photolithographically or by inducing periodic fiber bends or by introducing any other periodic distortions of the fiber core 16. The making of band-rejecting gratings 14 or long-period gratings that can be used in practicing the present invention is further described by Vengsarkar et al., Lightwave Technology, v.14(1), 58, 1996.

Irrespective of the particular manner of producing the band-rejecting gratings 14, the rejection area 13 receives lights from the dopant ions excited by the pump source 20. As can be appreciated by those skilled in the art, as the light from the excited dopants passes through the rejection area 13, certain wavelengths in an undesired wavelength range are rejected or coupled out from the core 16 and into the inner cladding 17. At the same time, the rejection area 13 substantially transmits wavelengths in a desired wavelength range. The amount of transmission may be defined by a transmission factor further described below.

In terms of desired and undesired wavelength ranges, and for this embodiment of the invention wherein the fiber core 16 includes an ytterbium dopant, it is known in the art that ytterbium exhibits various emission bands, including but not limited to about 970 to 980 nm and 1020 to 1050 nm. If, for example, one intends to use the fiber laser 10 to pump an erbium doped fiber amplifier, it is desired to only use the 970 to 980 nm emission band. In that case, the 970 to 980 nm band can be considered a desired wavelength range and the 1020 to 1050 nm band an undesired wavelength range. Accordingly, for this embodiment of the invention, the rejection area 13 couples out the 1020 to 1050 nm emission band, while substantially transmitting the 970 to 980 nm emission band. For other applications, different spectral regions may constitute the desired and the undesired wavelengths, e.g., 1064 and 1090 nm, respectively.

Figure 3:
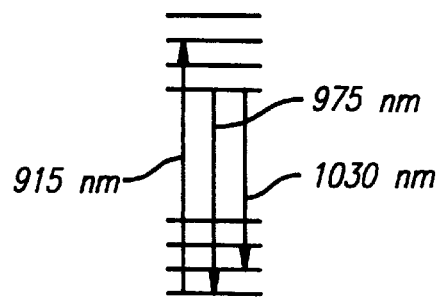
FIG. 3 is a diagram depicting the energy level structure for ytterbium.

In achieving a discrimination between the 970 to 980 nm band and the 1020 to 1050 nm band for a Yb-doped laser 10, it can be appreciated by those skilled in the art that a clamping of dopant population inversion by parasitic lasing or ASE at the undesired wavelengths must be overcome. This clamping of population inversion can be better understood in reference to FIG. 3. Therein, the energy level structure of ytterbium is depicted. As known in the art, absorption occurs anywhere between about 850 and 960 nm, e.g., at 915 nm. Lasing operation at about 975 nm involves a three-level scheme, while lasing at about 1030 nm involves a quasi four-level scheme. It is also known that the three-level scheme for ytterbium has a lasing threshold which requires more than a 50% population inversion for lasing operation. On the other hand, the quasi four-level scheme has a lasing threshold that only requires less than about a 10% inversion.

Should parasitic lasing or ASE occur at the undesired wavelength range, clamping effect will take place. In other words, the inversion will stay at the threshold level for the undesired wavelengths. Since the population inversion requirement for 1030 nm is lower than for 975 nm, the population inversion is forced to stay below the requirement for operating at 970–980 nm. Moreover, as the power from the pump source 20 is increased, more lasing will occur at 1030 nm without changes in the inversion, but not at 975 nm.

However, the present invention substantially eliminates the clamping effect or population inversion effect at undesired wavelengths by removing these wavelengths with the band-rejecting gratings 14. In other words, the parasitic operation or ASE at undesired wavelengths is suppressed or minimized while the population inversion requirements for operating at the desired wavelengths can be reached. Moreover, the dopant population inversion associated with the desired wavelength range is optimized. Photolythographic masks for making the gratings 14 are commercially found in typical lengths of 0.5 to 2.5 cm with a 10 to 500 μm period. The gratings 14 produced with such masks also have typical bandwidths of 30 to 100 nm and attenuation of 5 to 30 dB at the central wavelength. Typical reflectivity is about −70 dB.

The particular number of gratings 14 needed to remove the parasitic wavelengths is dependent upon the length of the fiber laser 10, the dopant concentration, the length of the individual gratings 14, and the ability of rejection or transmission of the individual gratings 14. Typical conditions for 975 nm lasing operation in a Yb-doped fiber laser requires a total population density in the upper or excited state manifold which can be denoted as n* wherein n*=0.5 $n_{Yb}$ and $n_{Yb}$ is the concentration of Yb ions in the fiber core 16. Such a population inversion will normally result in considerable gain at about 1030 nm. That gain increment can be denoted as $g_{1030}$ wherein $$g_{1030} = n^*\sigma_e - (n_{Yb} - n^*)\sigma_a$$

such that $\sigma_e$ is an emission spectroscopic cross section at about 1030 nm and $\sigma_a$ is an absorption spectroscopic cross section at about 1030 nm. Therefore, $$g_{1030} = 0.5\, n_{Yb}(\sigma_e - \sigma_a).$$

The cross sections are based, in this embodiment of the invention, on the reported results by Pask et al., "Ytterbium-Doped Silica Fiber Lasers: Versatile Sources for the 1–1.2 μm Region," IEEE Journal of Selected Topics in Quantum Electronics, Vol. 1, No. 1, April 1995. Therein, it is indicated that the emission spectroscopic cross section at about 1030 nm is about $0.57 \times 10^{-20}$ cm$^2$. The absorption spectroscopic cross section at about 1030 nm is about $0.07 \times 10^{-20}$ cm$^2$.

It should be understood that the foregoing refers to a preferred embodiment, and that those skilled in the art can repeat the above derivations for other wavelengths that constitute the desired and undesired wavelengths, e.g., 1064 nm and 1090 nm, respectively. In the general derivation, the inversion corresponding to the threshold gain at the desired wavelength is calculated from $$n^* \sigma_e^d = (n_{Yb} - n^*) \sigma_a^d$$

where $\sigma_e^d$ and $\sigma_a^d$ are emission and absorption cross sections, respectively, at the desired wavelength. The gain increment at the undesired wavelength is then $g_u$ where $$g_u = n^*(\sigma_e^u - \sigma_a^u)$$

such that $\sigma_e^u$ and $\sigma_a^u$ are the emission and absorption cross sections, respectively, at the undesired wavelength.

The number of gratings 14 is denoted as N and calculated by:

$$N = d/L \geq dg_u/\ln 1/T = nd(\sigma_a^d \sigma_e^u - \sigma_e^d \sigma_a^u)/[(\sigma_e^d + \sigma_a^d)\ln 1/T]$$

wherein n is the concentration of ions subject to excitation; d is the length of the fiber laser 10; L is the distance equal to the length of an individual grating 14 plus the distance to the beginning of the immediately adjacent grating 14; $\sigma_e^d$ and $\sigma_a^d$ are emission and absorption cross sections, respectively, at the desired wavelength; and $\sigma_e^u$ and $\sigma_a^u$ are emission and absorption cross sections, respectively, at the undesired wavelength; and T is a grating transmission factor at the undesired wavelength. Accordingly, the distance L can be given by the equation:

$$L = [(\sigma_e^d + \sigma_a^d)\ln 1/T]/[n(\sigma_a^d \sigma_e^u - \sigma_e^d \sigma_a^u)]$$

For the preferred embodiment of the invention, the number of gratings required to suppress the operation at the unwanted wavelength (i.e., 1030 nm) is therefore calculated as follows. At a 50% population inversion, unwanted radiation experiences gain of $\exp(0.5\, n_{Yb}(\sigma_e - \sigma_a)L)$. Laser operation at the unwanted wavelengths will be suppressed if this gain is compensated by the rejection from an individual grating 14, i.e., if $$T \exp(0.5 n(\sigma_e - \sigma_a)L) \leq 1$$

Therefore, the total number of gratings N is given by:

$$N = d/L \geq 0.5 dn_{Yb}(\sigma_e - \sigma_a)/\ln 1/T$$

However, the above condition is the upper limit for N and, thus, a smaller number of gratings 14 can be used under practical conditions, since the resonator feedback at the unwanted wavelengths is less than unity.

In still referring to the preferred embodiment of the invention, the gratings 14 are in an end-to-end relationship, with each grating 14 typically being about 0.5 to 2.5 cm long. If a modest grating transmission factor of 0.1 (i.e., 10 dB attenuation) is assumed at the center of the band-rejecting gratings 14, and if a typical dopant concentration of 1 wt % (i.e., $n_{Yb} = 0.77 \times 10^{20}$ cm$^3$) is assumed, then the distance L between the gratings 14 is about 12 cm, and the number of gratings 14 is about 16 for a 2 meter long fiber laser 10.

To achieve lasing at the desired wavelength range, a reflective grating 15 is provided at each of the distal ends 11, 12. The reflective grating 15 reflects light, in this embodiment of the invention, at about 970 to 980 nm. Preferably, the grating 15 at the distal end 11 has a reflection coefficient such that it reflects more than about 90%, whereas the grating 15 at the distal end 12 has a different reflection coefficient such that it reflects about 1–20% at the desired wavelength range. As such, most of an output power 21 is directed through the distal end 12. Actual reflection coefficients of the gratings 15 can be optimized for a particular fiber geometry and doping concentration. Further, although FIG. 1 depicts a single grating 15 at each distal end 11, 12, it is contemplated that multiple gratings 15 can be disposed at a single end to thereby affect the radiation spectrum at the desired wavelength range.

As with the band-rejecting gratings 14, the reflective gratings 15 can be incorporated into the fiber core 16 by any well known methods, such as photolithography. Although the length may vary, each reflective grating 15 is about 2.5 cm in length. The reflective grating 15 at each distal end 11, 12 is separated from the respective band-rejecting grating 14 nearest each distal end 11, 12 by the distance L, which is the same distance that separates each band-rejecting grating 14. Specifically, the distance from the reflective gratings 15 to the band-rejecting grating 14 is measured by the equation:

$$L = 2/[n_{Yb}(F_e - F_a)]\ln 1/T$$

with the distance L including the length of the individual reflective grating 15 to the beginning of the immediately adjacent band-rejecting grating 14. The particular distance between the reflective grating 15 and the band-rejecting grating 14 provides sufficient rejection of the unwanted wavelength.

With the above configuration for the fiber laser 10, a pump source 20 is positioned at the distal end 11 to provide end pumping at a wavelength range of about 880–950 nm for this embodiment of the invention. The pump source 20 can be one of many commercially available fiber-bundled-coupled diode arrays or any other diode arrays providing sufficient intensity of radiation at the distal end 11. For example, the pump source 20 can be a multi-mode laser diode manufactured by SDL or HDOS. It can be appreciated that as the pump source 20 pumps the fiber laser 10, light passes through the inner cladding 17 of the fiber laser 10 and excites the dopant atoms located in the core 16. The excited atoms emit at the desired and undesired wavelengths that pass through the core 16. The band-rejecting gratings 14 couple the undesired or parasitic longer wavelengths out from the core 16, and the desired shorter wavelengths pass through the band-rejecting gratings 14 almost intact. Thereafter, the light passes through the reflective grating 15 at the distal end 12, which provides positive feedback at the desired wavelength to the resonator cavity formed by the gratings 15. The parasitic wavelengths, which may have been introduced after the first pass of the light through the band-rejecting gratings 14, can be removed on consecutive passes. And this process of rejection and selective feedback suppresses parasitic lasing or ASE at the undesired wavelength and thereby eliminates clamping of the population inversion at the threshold level for the undesired wavelength. As a result, the threshold inversion for the desired wavelength can be reached, leading to laser generation at the desired wavelength. For this embodiment of the invention, the output 21 can then be used to pump another device, such as an EDFA.

It should be understood, of course, that the foregoing relates to preferred embodiments of the invention and that modifications may be made without departing from the spirit and scope of the invention as set forth in the following claims.

What is claimed is:

1. A cladding pumped fiber laser, comprising:
    a pair of reflective gratings which reflect light propagating inside a fiber core of said laser at a desired wavelength range; and
    a band-rejecting grating disposed between said reflective gratings, said rejecting grating coupling light out from said core at an undesired wavelength range, said undesired wavelength range having wavelengths greater in length than wavelengths in said desired wavelength range.

2. The laser of claim 1, wherein said desired wavelength range and undesired wavelength range are each characterized by a respective population inversion requirement, with said desired wavelength range having a higher population inversion requirement in comparison to said undesired wavelength range.

3. The laser of claim 1, further comprising a plurality of band-rejecting gratings.

4. The laser of claim 3, wherein said band-rejecting gratings are all disposed between said reflective gratings.

5. The laser of claim 3, wherein said band-rejecting gratings are in a spaced apart relationship.

6. A doped, cladding pumped fiber laser, comprising:
    a pair of reflective gratings which reflect light propagating inside a fiber core of said laser at a desired wavelength range; and
    a plurality of band-rejecting gratings disposed between said reflective gratings, said band-rejecting gratings coupling light at an undesired wavelength range out of said core, wherein said desired wavelength range and undesired wavelength range are each characterized by a respective population inversion requirement, with said desired wavelength range having a higher population inversion requirement in comparison to said undesired wavelength range.

7. The laser of claim 6, wherein said undesired wavelength range is characterized by wavelengths greater in length than wavelengths in said desired wavelength range.

8. The laser of claim 6, wherein said band-rejecting gratings are disposed in an end-to-end relationship.

9. The laser of claim 6, wherein said band-rejecting gratings are each separated by a distance of approximately L whereby $L=[(\sigma_e^d+\sigma_a^d)\ln 1/T]/[n(\sigma_a^d\sigma_e^u-\sigma_e^d\sigma_a^u)]$, n is a concentration of ions subject to excitation, $\sigma_a^d$ is an absorption cross section at said desired wavelength range, $\sigma_e^u$ is an emission cross section at said undesired wavelength range, $\sigma_e^d$ is an emission cross section at said desired wavelength range, $\sigma_a^u$ is an absorption cross section at said undesired wavelngth range, and T is a band-rejecting grating transmission factor.

10. The laser of claim 6, wherein said band-rejecting gratings are present in a number described by N whereby $N=d/L \geq dn(\sigma_a^d\sigma_e^u-\sigma_e^d\sigma_a^u)/[\sigma_e^d+\sigma_a^d)\ln 1/T]$, d is a length of said fiber laser, L is a distance separating adjacent band-rejecting gratings, n is a concentration of ions subject to excitation, $\sigma_a^d$ is an absorption cross section at said desired wavelength range, $\sigma_e^u$ is an emission cross section at said undesired wavelength range, $\sigma_e^d$ is an emission cross section at said desired wavelength range, $\sigma_a^u$ is an absorption cross section at said undesired wavelngth range, and T is a band-rejecting grating transmission factor.

11. A Yb-doped cladding pumped fiber laser, comprising:
    a pair of reflective gratings which reflect light propagating through a fiber core of said laser at a wavelength range of about 970 to 980 nm; and
    a plurality of band-rejecting gratings disposed between said reflective gratings, said band-rejecting gratings coupling light from said core at wavelengths greater than about 980 nm.

12. The laser of claim 11, wherein said band-rejecting gratings are for coupling light at wavelengths of about 1030 nm.

13. The laser of claim 11, wherein said ajdacent band-rejecting gratings are separated by a distance L which is equal to a length of an individual grating plus the distance to an immediately adjacent grating, wherein $L=2/[n_{Yb}(\sigma_e-\sigma_a)]\ln 1/T$, $n_{Yb}$ is a concentration of Yb ions subject to excitation, $\sigma_e$ is an emission spectroscopic cross sectional area greater than about 980 nm, $\sigma_a$ is an absorption spectroscopic cross section area greater than about 980 nm, and T is a band-rejecting grating transmission factor.

14. The laser of claim 11, wherein said band-rejecting gratings are present in a number described by N whereby $N=d/L \geq 0.5 dn_{Yb}(\sigma_e-\sigma_a)/\ln 1/T$, d is a length of said fiber laser, L is equal to a length of an individual band-rejecting grating plus a distance to an adjacent band-rejecting grating, $n_{Yb}$ is a concentration of Yb ions subject to excitation, $\sigma_e$ is an emission spectroscopic cross sectional area of said undesired wavelength range, $\sigma_a$ is an absorption spectroscopic cross sectional area of said undesired wavelength range, and T is a band-rejecting grating transmission factor.

15. The laser of claim 11, wherein said laser further comprises a pair of distal ends and said reflective gratings are disposed near said distal ends.

16. The laser of claim 15, wherein said reflective gratings have different reflection coefficients with respect to said desired wavelength range.

17. A method pumping an erbium doped fiber amplifier at about 970 to 980 nm, comprising the steps of:
    providing a Yb-doped, cladding pumped fiber laser;
    rejecting light at wavelengths greater than about 1000 nm in said laser by the use of a band-rejecting grating; and
    reflecting light at wavelengths of about 970 to 980 nm in said laser by a pair of reflective gratings disposed about said band-rejecting grating.

18. The method of claim 17, said laser further comprising a plurality of band-rejecting gratings.

19. The method of claim 18, wherein said band-rejecting gratings are all disposed between said reflective gratings.

20. The method of claim 18, wherein said band-rejecting gratings are in a spaced apart relationship.

21. The method of claim 18, wherein said band-rejecting gratings are disposed in an end-to-end relationship.

22. The method of claim 18, wherein said band-rejecting gratings are each separated by a distance of approximately L whereby $L=2/[n_{Yb}(\sigma_e-\sigma_a)]\ln 1/T$, $n_{Yb}$ is a concentration of Yb ions subject to excitation, $\sigma_e$ is an emission spectroscopic cross sectional area greater than about 1000 nm, $\sigma_a$ is an absorption spectroscopic cross sectional area greater than about 1000 nm, and T is a band-rejecting grating transmission factor.

23. A method of wavelength discrimination for a doped, cladding pumped fiber laser wherein an undesired wavelength range has wavelengths which are longer than those wavelengths in a desired wavelength range, comprising the steps of:

rejecting light at said undesired wavelength range at a rejection area within said laser, said rejection area being intermediate a pair of distal ends of said laser; and reflecting light at said desired wavelength range, said step of reflecting light occurring substantially at said distal ends.

24. The method of claim 23, further comprising the step of minimizing a dopant population inversion effect associated with said undesired wavelength range, with said desired and undesired wavelength ranges each being characterized by a respective population inversion requirement, said desired wavelength range having a higher population inversion requirement in comparison to said undesired wavelength range.

25. The method of claim 23, further comprising the step of optimizing a dopant population inversion associated with said desired wavelength range, with said desired and undesired wavelength ranges each being characterized by a respective population inversion requirement, said desired wavelength range having a higher population inversion requirement in comparison to said undesired wavelength range.

26. The method of claim 23, further comprising the step of transmitting light at said desired wavelength range, said step of transmitting occurring at said rejection area.

27. The method of claim 23, further comprising the step of placing a reflective grating at a distal end of said laser.

28. The method of claim 23, further comprising the step of placing a band-rejecting grating at said rejection area.

29. The method of claim 23, further comprising the step of placing a plurality of band-rejecting gratings at said rejection area.

30. The method of claim 29, wherein said band-rejecting gratings are each separated by a distance of approximately L whereby $L=[(\sigma_e^d+\sigma_a^d)\ln 1/T]/[n(\sigma_a^d\sigma_e^u-\sigma_e^d\sigma_a^u)]$, n is a concentration of ions subject to excitation, $\sigma_a^d$ is an absorption cross section at said desired wavelength range, $\sigma_e^d$ is an emission cross section at said undesired wavelength range, $\sigma_e^d$ is an emission cross section at said desired wavelength range, $\sigma_a^u$ is an absorption cross section at said undesired wavelength range, and T is a band-rejecting grating transmission factor.

31. The method of claim 29, wherein said band-rejecting gratings are present in a number described by N whereby $N=d/L \geq dn (\sigma_a^d\sigma_e^u-\sigma_e^d\sigma_a^u)/[\sigma_e^d+\sigma_a^d) \ln 1/T]$, d is a length of said fiber laser, L is a distance separating adjacent band-rejecting gratings, n is a concentration of ions subject to excitation, $\sigma_a^d$ is an absorption cross section at said desired wavelength range, $\sigma_e^u$ is an emission cross section at said undesired wavelength range, $\sigma_e^d$ is an emission cross section at said desired wavelength range, $\sigma_a^u$ is an absorption cross section at said undesired wavelngth range, and T is a band-rejecting grating transmission factor.

* * * * *